(12) United States Patent
Ishida

(10) Patent No.: US 7,619,341 B2
(45) Date of Patent: Nov. 17, 2009

(54) ROTOR OF ROTATING ELECTRIC MACHINE

(75) Inventor: Takeshi Ishida, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 110 days.

(21) Appl. No.: 11/662,928

(22) PCT Filed: Sep. 28, 2005

(86) PCT No.: PCT/JP2005/018403

§ 371 (c)(1),
(2), (4) Date: Mar. 16, 2007

(87) PCT Pub. No.: WO2007/007420

PCT Pub. Date: Jan. 18, 2007

(65) Prior Publication Data

US 2007/0205686 A1    Sep. 6, 2007

(51) Int. Cl.
*H02K 49/02* (2006.01)

(52) U.S. Cl. .............................. 310/156.08; 310/156.21

(58) Field of Classification Search ................................. 310/156.01–156.84
See application file for complete search history.

(56) References Cited

U.S. PATENT DOCUMENTS

2007/0290566 A1 * 12/2007 Mizutani et al. ....... 310/156.56

FOREIGN PATENT DOCUMENTS

| JP | 02-034805 | Y2 | 9/1990 |
| JP | 04-45411 | Y2 | 10/1992 |
| JP | 10-285850 | | 10/1998 |
| JP | 11-89735 | * | 4/1999 |
| JP | 11-289699 | A | 10/1999 |
| JP | 11-355987 | A | 12/1999 |
| JP | 2000-037053 | | 2/2000 |
| JP | 2000-201444 | | 7/2000 |
| JP | 2003-259577 | | 9/2003 |
| JP | 2005-102461 | A | 4/2005 |

* cited by examiner

*Primary Examiner*—Nguyen N Hanh
(74) *Attorney, Agent, or Firm*—Kenyon & Kenyon LLP

(57) ABSTRACT

A stainless plate is attached to overlie a magnetic steel plate. An upper portion of a through-hole for inserting a magnet is covered with the stainless plate. Thereby, adhesion between the magnetic steel plate and an end plate with an adhesive for fixing a permanent magnet is prevented. Since an amount of thermal expansion and thermal shrinkage obtained as a result of cooling and heating the stainless plate is closer to an amount of thermal expansion and thermal shrinkage of the magnetic steel plate than to an amount of thermal expansion and thermal shrinkage of the end plate, stress imposed on the magnetic steel plate is reduced as compared to a conventional case. Consequently, fatigue breakdown of the magnetic steel plate due to a difference in linear expansion coefficients of the end plate and the magnetic steel plate is prevented. Thereby, a rotating electric machine having a rotor core portion with improved reliability can be provided.

10 Claims, 7 Drawing Sheets

US 7,619,341 B2

ROTOR OF ROTATING ELECTRIC MACHINE

This is a 371 national phase application of PCT/JP2005/018403 filed 28 Sep. 2005, the content of which is incorporated herein by reference.

TECHNICAL FIELD

The present invention relates to a rotor of a rotating electric machine.

BACKGROUND ART

A rotating electric machine such as a motor, a generator, or the like includes a permanent magnet type synchronous rotating machine having a permanent magnet in its rotor.

Japanese Patent Laying-Open No. 2000-037053 discloses a rotating electric machine including a stator having a stator coil, a rotor constituted by a permanent magnet for forming a magnetic pole mounted into a through-hole provided in a rotor core, and a rotation shaft pressed into the rotor core.

One of the embodiments of the document has a description that an adhesive is applied to a non-magnetic end plate to be pressed into the rotation shaft, on the side of the rotor core, to reliably prevent the end plate and the permanent magnet from being pulled out during high-speed rotation.

However, when the non-magnetic end plate is directly bonded to the rotor core, the core portion bears a burden when the rotating electric machine is subjected to repeated thermal cycles of heating and cooling, due to the difference in linear expansion coefficients of the materials of the two components.

FIG. 10 is a view for illustrating a shape of a magnetic steel plate 52 used as a rotor core.

Referring to FIG. 10, magnetic steel plate 52 is an annular steel plate having a hole in its central portion, and the hole portion in the central portion has projections 111 and 112 fitting to a shaft for positioning. Further, the peripheral portion has holes 101 and 102 for inserting permanent magnets.

Such magnetic steel plates 52 are stacked to form a rotor core.

FIG. 11 is a view for illustrating a section of a rotor corresponding to the portion XI-XI in FIG. 10.

Referring to FIG. 11, a plurality of magnetic steel plates 52 are stacked over an end plate 41. Each of holes 101 and 102 in magnetic steel plate 52 in FIG. 10 forms a through-hole for inserting a permanent magnet 56 in the core. An adhesive 54 is injected into the through-hole, permanent magnet 56 is inserted, and finally an end plate 40 is mounted onto the core. On this occasion, adhesive 54 may enter a gap between end plates 40 and 41 and the rotor core, and bond the magnetic steel plates at the ends of the rotor core to end plates 40 and 41.

FIG. 12 is a view for illustrating stress imposed between the end plate and the magnetic steel plate.

Referring to FIG. 12, suppose that end plate 40 and magnetic steel plate 52 are partly bonded with adhesive 54. For example, in FIG. 10, there may be a case where a portion on the periphery of holes 101 and 102 is partially bonded to end plate 40 with an adhesive.

Typically, end plate 40 is made of an aluminum alloy, and as shown in FIG. 12, an amount of thermal expansion and thermal shrinkage D40 of an aluminum alloy is greater than an amount of thermal expansion and thermal shrinkage D52 of magnetic steel plate 52.

When end plate 40 and magnetic steel plate 52 have significantly different linear expansion coefficients, magnetic steel plate 52, which is thinner and disadvantageous in terms of shape, is subjected to excessive stress due to repeated heating and cooling. In particular, a region 103 in FIG. 10 is thinner because holes 101 and 102 are provided therein. When magnetic steel plate 52 in the vicinity of holes 101 and 102 is bonded to end plate 40 with the adhesive, stress due to the difference in linear expansion coefficients is concentrated in region 103. If such stress is repeatedly imposed, fatigue breakdown of the magnetic steel plate may occur.

DISCLOSURE OF THE INVENTION

One object of the present invention is to provide a rotor of a rotating electric machine with improved reliability.

In summary, the present invention provides a rotor of a rotating electric machine, including: a rotation shaft; a core portion placed around the rotation shaft and provided with a plurality of through-holes; a plurality of permanent magnets each accommodated in each of the plurality of through-holes; a filler filled into a gap between the permanent magnet and the core portion inside each of the plurality of through-holes; a pair of end plates sandwiching the core portion from both sides to cover openings of the through-hole; and an adhesion suppressing portion provided in a boundary portion between the end plate and the core portion to suppress adhesion between the end plate and the core portion with the filler.

Preferably, the adhesion suppressing portion is a non-magnetic member lying in a gap between each of the pair of end plates and the core portion, and a difference between a linear expansion coefficient of the non-magnetic member and a linear expansion coefficient of the core portion is less than a difference between a linear expansion coefficient of the end plate and the linear expansion coefficient of the core portion.

More preferably, the non-magnetic member is a plate-shaped member formed to cover at least the through-hole.

More preferably, the non-magnetic member is made of a stainless steel.

Preferably, the adhesion suppressing portion is a non-magnetic member lying in a gap between each of the pair of end plates and the core portion, and the non-magnetic member is more elastic than the end plate.

Preferably, the adhesion suppressing portion is a layer of a mold release agent applied to the end plate.

Preferably, the end plate includes a non-magnetic main member and a non-magnetic sub-member fitted into the main member and covering the hole, and a difference between a linear expansion coefficient of the sub-member and a linear expansion coefficient of the core portion is less than a difference between a linear expansion coefficient of the main member and the linear expansion coefficient of the core portion.

More preferably, the sub-member is made of a stainless steel.

Preferably, the end plate includes a non-magnetic main member and a non-magnetic sub-member fitted into the main member and covering the through-hole, and the sub-member is more elastic than the main member.

Preferably, the core portion includes a plurality of ferromagnetic plates stacked parallel to a plane orthogonal to the rotation shaft, and each of the plates is provided with a hole for forming the through-hole by stacking the plates.

According to another aspect of the present invention, there is provided a rotor of a rotating electric machine, including: a rotation shaft; a core portion placed around the rotation shaft and provided with a plurality of through-holes; a plurality of permanent magnets each accommodated in each of the plurality of through-holes; a pair of end plates sandwiching the core portion from both sides to cover openings of the through-hole; and a filler filled into a gap between the permanent magnet and the core portion inside each of the plurality of through-holes. The filler is a putty material which is curable but has a weak adhesion force to a surrounding member.

Preferably, the core portion includes a plurality of ferromagnetic plates stacked parallel to a plane orthogonal to the rotation shaft, and each of the plates is provided with a hole for forming the through-hole by stacking the plates.

According to the present invention, adhesion between the end plate and the magnetic steel plate with the adhesive can be suppressed, preventing fatigue breakdown of the magnetic steel plate due to the difference in the linear expansion coefficients of the end plate and the magnetic steel plate.

BEST MODES FOR CARRYING OUT THE INVENTION

Figure 1:
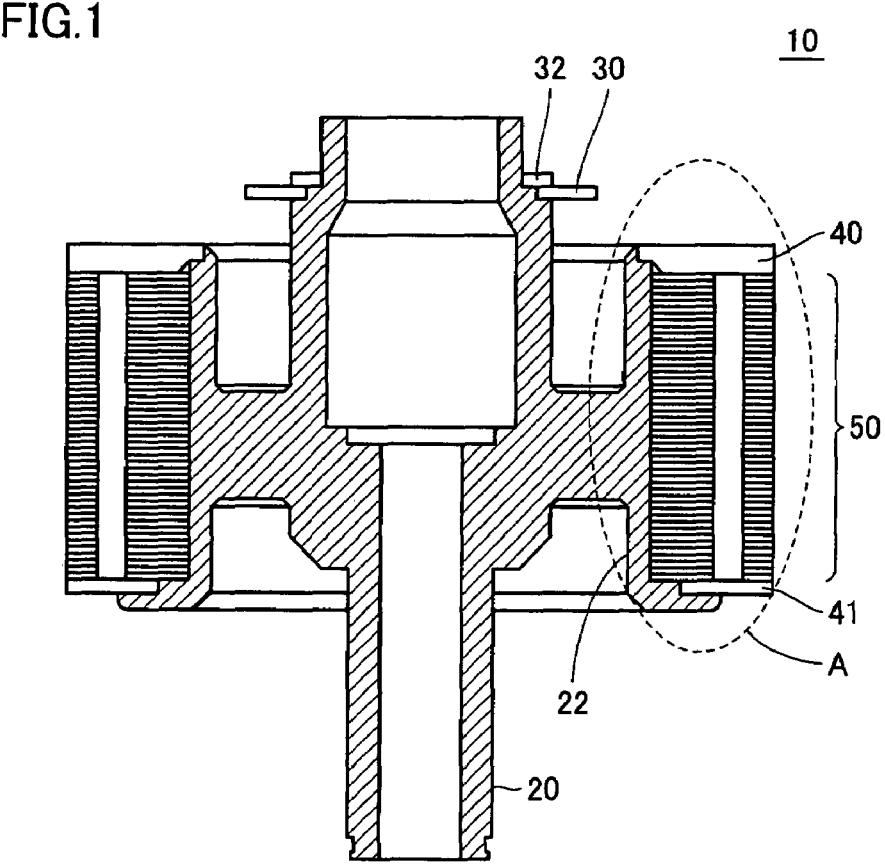
FIG. 1 is a cross sectional view of a rotor of a rotating electric machine in the present embodiment.

Hereinafter, embodiments of the present invention will be described in detail with reference to the drawings, in which identical reference numerals refer to identical or corresponding parts, and a description thereof will not be repeated.

First Embodiment

FIG. 1 is a cross sectional view of a rotor of a rotating electric machine in the present embodiment.

Referring to FIG. 1, a rotor 10 includes a shaft 20, a rotor core 50 held around shaft 20, end plates 40 and 41 sandwiching rotor core 50, a resolver 30 detecting rotation of rotor 10, and a snap ring 32 securing resolver 30 to prevent it from being pulled out.

Around shaft 20 is formed a flange 22 for holding rotor core 50 having stacked magnetic steel plates.

Figure 2:
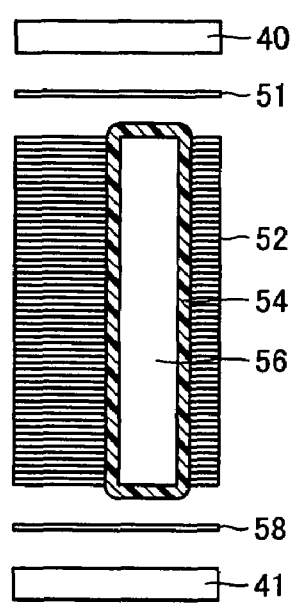
FIG. 2 is a view for illustrating a portion A in FIG. 1 in detail.

FIG. 2 is a view for illustrating a portion A in FIG. 1 in detail.

Figure 3:
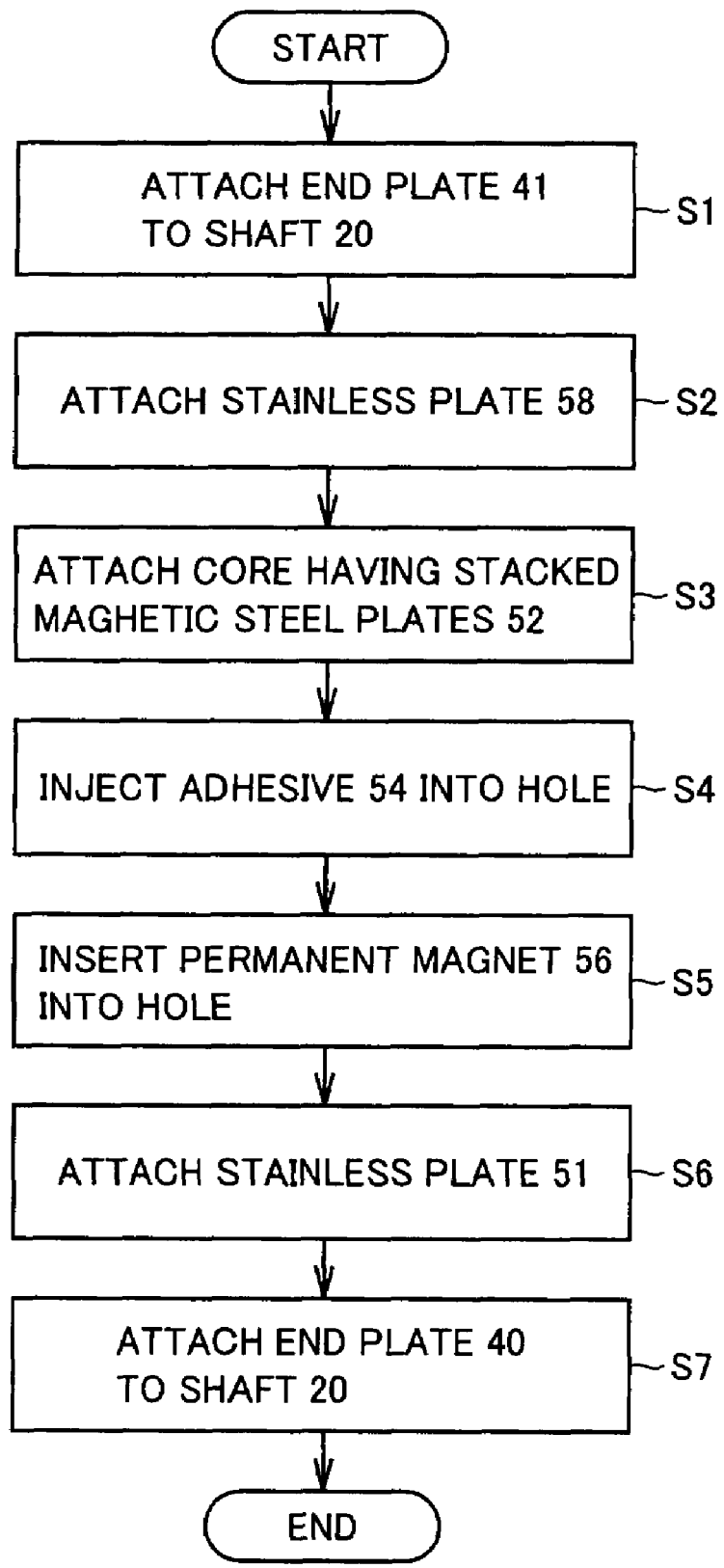
FIG. 3 is a flow chart for illustrating a process of assembling the rotor.

FIG. 3 is a flow chart for illustrating a process of assembling the rotor.

Referring to FIGS. 2 and 3, firstly in step S1, end plate 41 is attached to shaft 20 in FIG. 1. Next, in step S2, a stainless plate 58 is attached over the end plate. Further, in step S3, the rotor core having stacked magnetic steel plates 52 is attached to overlie stainless plate 58.

Figure 10:
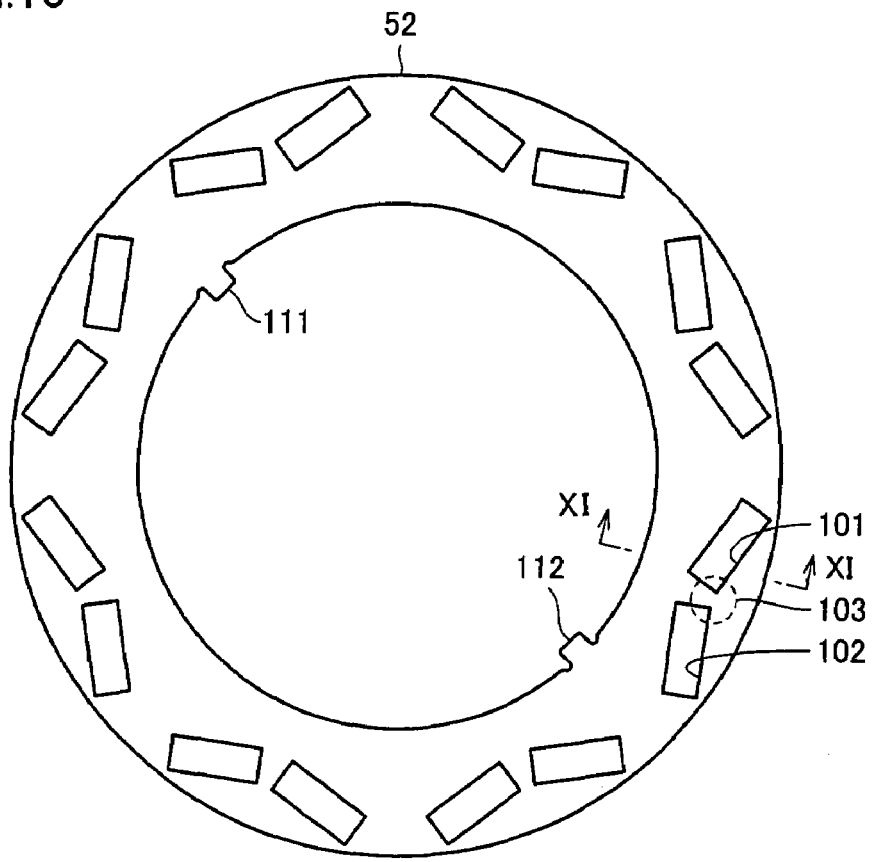
FIG. 10 is a view for illustrating a shape of magnetic steel plate 52 used as a rotor core.

As a result of stacking magnetic steel plates 52, holes 101 and 102 shown in FIG. 10 each form a through-hole for inserting a permanent magnet, and a lower portion thereof is covered with stainless plate 58.

Next, in step S4, an appropriate amount of adhesive 54 is injected into the through-hole for inserting permanent magnet 56. Thereafter, in step S5, permanent magnet 56 is inserted into the hole. Thereby, the liquid level of adhesive 54 rises, and adhesive 54 is applied all over the through-hole for inserting the magnet in rotor core 50.

Next, in step S6, a stainless plate 51 is attached to overlie magnetic steel plates 52. An upper portion of the through-hole for inserting the magnet is covered with stainless plate 51.

Finally, end plate 40 is attached to shaft 20, and the assembling is completed.

A non-magnetic material is employed for end plates 40 and 41 and stainless plates 51 and 58 to prevent a magnetic flux of the permanent magnet from leaking in a direction parallel to the rotation axis of the shaft and causing loss. End plates 40 and 41 are preferably made of a lightweight aluminum alloy.

Figure 4:
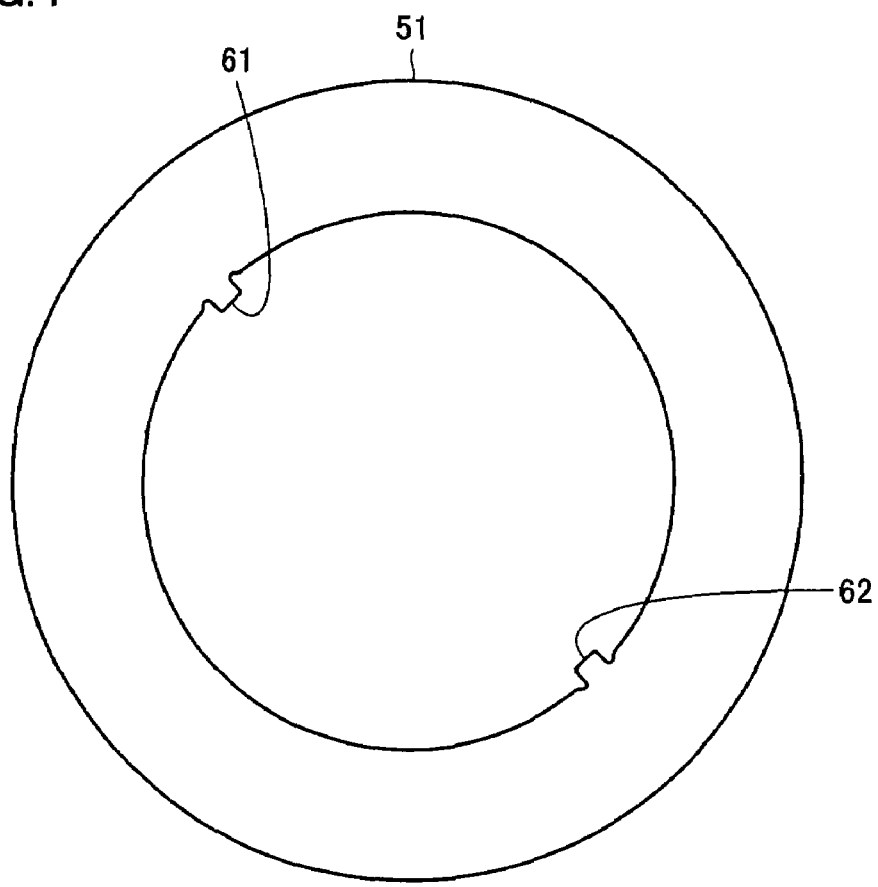
FIG. 4 is a view for illustrating a shape of a stainless plate 51.

FIG. 4 is a view for illustrating a shape of stainless plate 51.

Referring to FIG. 4, stainless plate 51 has a shape like a doughnut, without holes 101 and 102 provided in the shape of magnetic steel plate 52 illustrated in FIG. 10. A hole portion in the central portion has projections 61 and 62 fitting to a shaft for positioning. By placing stainless plate 51 to overlie magnetic steel plates 52, the through-hole for inserting the magnet is covered with stainless plate 51.

It is to be noted that, since stainless plate 58 in FIG. 2 has the same shape as that of stainless plate 51, a description thereof will not be repeated.

Figure 5:
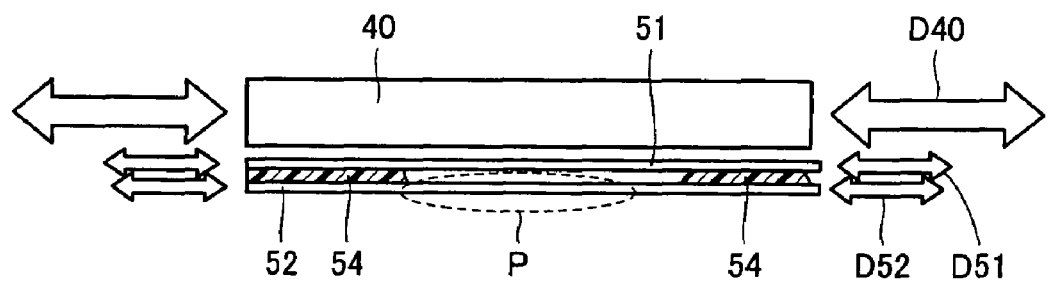
FIG. 5 is a view for illustrating stress imposed on a magnetic steel plate in a first embodiment.

FIG. 5 is a view for illustrating stress imposed on the magnetic steel plate in the first embodiment.

Referring to FIG. 5, stainless plate 51 lies between end plate 40 and magnetic steel plate 52. Stainless plate 51 has a shape to cover the hole for inserting the permanent magnet provided in magnetic steel plate 52.

Consequently, adhesion between magnetic steel plate 52 and end plate 40 with adhesive 54 for fixing the permanent magnet is prevented.

For example, end plate 40 is made of an aluminum alloy, and it has a linear expansion coefficient of about $24 \times 10^{-6}$, whereas magnetic steel plate 52 has a linear expansion coefficient of about $13 \times 10^{-6}$. On the other hand, a stainless steel has a linear expansion coefficient of about $18 \times 10^{-6}$, which is closer to the linear expansion coefficient of the steel plate than to the linear expansion coefficient of the aluminum alloy.

Figure 12:
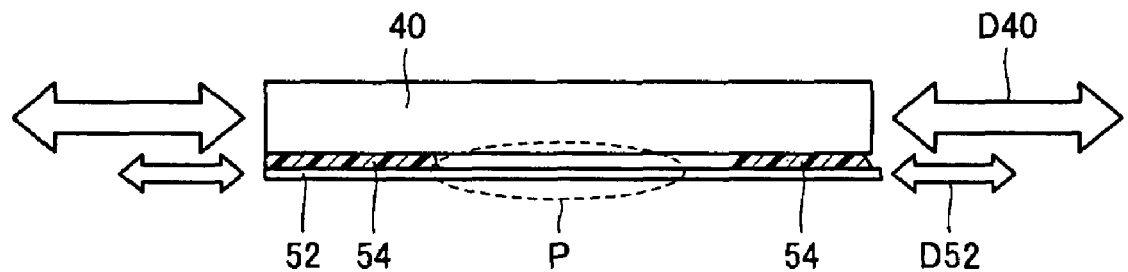
FIG. 12 is a view for illustrating stress imposed between an end plate and a magnetic steel plate.

Consequently, repeated stress imposed on a portion P is relieved more as compared to the case shown in FIG. 12. Specifically, an amount of thermal expansion and thermal shrinkage D51 obtained as a result of cooling and heating the stainless plate is closer to the amount of thermal expansion and thermal shrinkage D52 of magnetic steel plate 52 than to the amount of thermal expansion and thermal shrinkage D40 of the end plate. Accordingly, the stress imposed on the magnetic steel plate is reduced as compared to the case shown in FIG. 12.

Consequently, fatigue breakdown of the magnetic steel plate due to the difference in linear expansion coefficients of the end plate and the magnetic steel plate is prevented.

The end plate should be made of a non-magnetic material to prevent loss in a magnetic circuit. Further, since the stacked magnetic steel plates are pressed from both sides, a certain degree of stiffness is required. Furthermore, the end plate is preferably lightweight to suppress the overall weight of the rotor. For this reason, an aluminum alloy or the like is employed.

As shown in FIG. 2, by providing thin stainless plates 51 and 58 between end plates 40 and 41 and magnetic steel plates 52, a lower cost and a lighter weight can be achieved as compared to the case where an expensive stainless material is employed as an end plate.

Although a stainless steel has been illustrated as a material of the plate sandwiched between the magnetic steel plate and the end plate in the first embodiment, the material of the plate is not limited to this, and the plate may be made of any other material which is non-magnetic and has a linear expansion coefficient close to that of the magnetic steel plate constituting the rotor core.

Further, if non-magnetic plates made of an elastic material are employed instead of thin stainless plates 51 and 58, stress on the magnetic steel plate can be relieved regardless of the linear expansion coefficient thereof.

Second Embodiment

Figure 6:
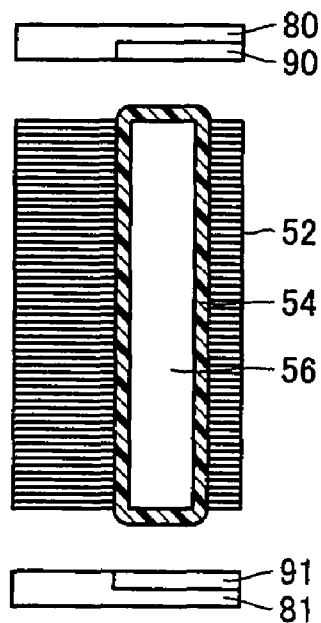
FIG. 6 is a view for illustrating a rotor in a second embodiment.

FIG. 6 is a view for illustrating a rotor in a second embodiment.

Referring to FIG. 6, the rotor in the second embodiment includes an end plate formed of a main member 80 and a sub-member 90, and an end plate formed of a main member 81 and a sub-member 90, instead of end plates 40 and 41 and stainless plates 51 and 58 of the rotor in the first embodiment illustrated in FIG. 2.

Non-magnetic sub-member 90 is fitted into main member 80. Similarly, non-magnetic sub-member 91 is fitted into main member 81. Main members 80 and 81 are preferably made of a lightweight and nonmagnetic aluminum alloy, as end plates 40 and 41 in the first embodiment. Further, sub-members 90 and 91 are made of a non-magnetic material having a linear expansion coefficient close to that of magnetic steel plate 52. For example, sub-members 90 and 91 can be made of a stainless steel.

Figure 7:
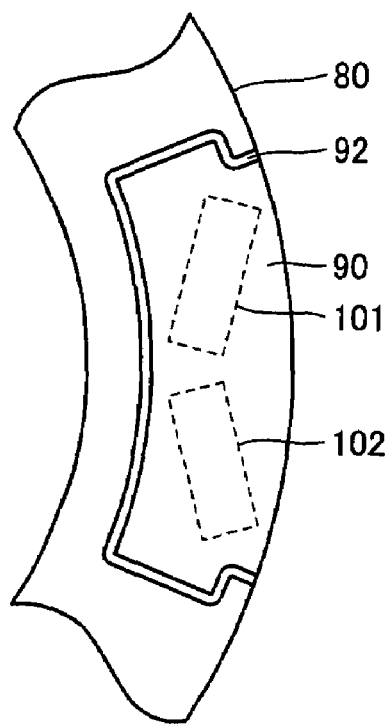
FIG. 7 is an enlarged view showing a portion of an end plate in FIG. 6.

FIG. 7 is an enlarged view showing a portion of the end plate in FIG. 6.

In FIG. 7, sub-member 90 is fitted into a portion of main member 80 of the end plate in the vicinity of openings of holes 101 and 102 in the magnetic steel plate indicated by broken lines. Sub-member 90 is shaped such that it does not jump out of main member 80 from an outer circumference due to centrifugal force caused by the rotation of the rotor.

When the rotor is assembled, the openings of holes 101 and 102 are covered with sub-member 90. Accordingly, sub-member 90 serves as an adhesion suppressing portion suppressing adhesion force of the adhesive to main member 80. Similarly, sub-member 91 in FIG. 6 also serves as an adhesion suppressing portion suppressing adhesion force of the adhesive to main member 81.

Main member 80 of the end plate is, for example, an aluminum alloy, and sub-member 90 is, for example, a non-magnetic stainless steel. The linear expansion coefficient of sub-member 90 is closer to the linear expansion coefficient of magnetic steel plate 52 than to the linear expansion coefficient of main member 80.

Further, an elastic body 92 is provided at a boundary portion between main member 80 and sub-member 90 to alleviate the difference in the linear expansion coefficients of main member 80 and sub-member 90. Examples of elastic body 92 may include rubber, an adhesive which is soft even after curing, and the like. Thereby, even when the magnetic steel plate and sub-member 90 are bonded with adhesive 54 for fixing the permanent magnet, stress is relieved as compared to a conventional case, and fatigue breakdown of the magnetic steel plate is prevented.

Figure 8:
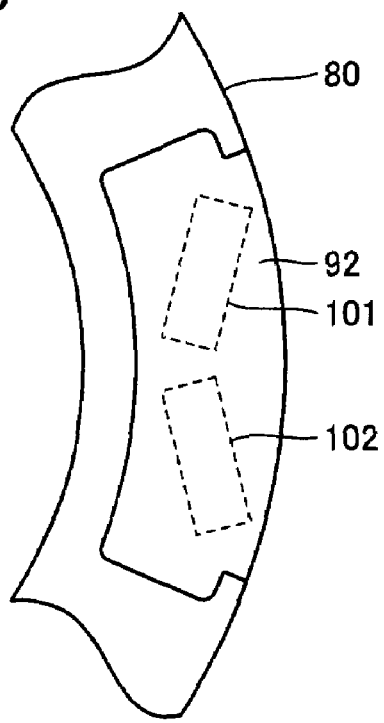
FIG. 8 shows a modification of the second embodiment.

FIG. 8 shows a modification of the second embodiment.

In FIG. 8, elastic body 92 is fitted in the vicinity of the hole for inserting the permanent magnet in the magnetic steel plate. Thereby, even when the magnetic steel plate and elastic body 92 are bonded with the adhesive for fixing the permanent magnet, stress imposed on the magnetic steel plate can be reduced because elastic body 92 deforms when a thermal cycle is applied. Consequently, fatigue breakdown of the magnetic steel plate is prevented.

Third Embodiment

Figure 9:
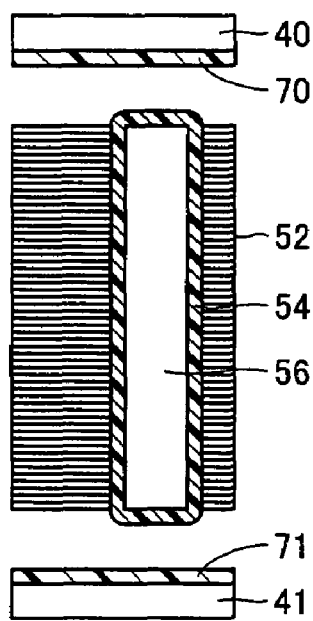
FIG. 9 is a view for illustrating a rotor in a third embodiment.

FIG. 9 is a view for illustrating a rotor in a third embodiment.

Referring to FIG. 9, in the third embodiment, a mold release agent is applied beforehand to end plates 40 and 41 on the sides in contact with the magnetic steel plates, to provide layers 70 and 71 of the mold release agent. These layers 70 and 71 of the mold release agent serve as adhesion suppressing portions suppressing adhesion force of the adhesive to end plates 40 and 41.

Concrete examples of the mold release agent include a silicon-based coating agent, a fluorine-based coating agent (Teflon (registered trademark) coat), and the like.

Thereby, adhesion between magnetic steel plates 52 and end plates 40 and 41 with adhesive 54 is prevented, and thus stress imposed on magnetic steel plates 52 can be reduced even when end plates 40 and 41 expand and shrink during a thermal cycle.

Fourth Embodiment

Figure 11:
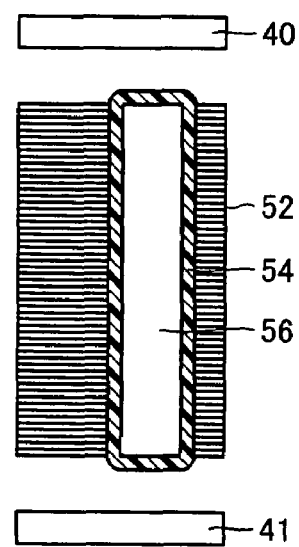
FIG. 11 is a view for illustrating a section of a rotor corresponding to the portion XI-XI in FIG. 10.
Figure 13:
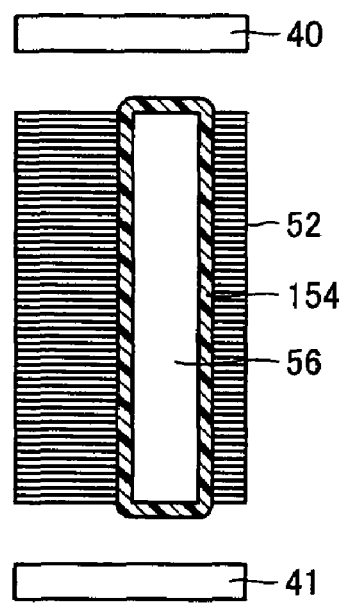
FIG. 13 is a view for illustrating a rotor in a fourth embodiment.

In a fourth embodiment, adhesive 54 used in FIG. 11 is replaced with a filler 154 having a low adhesion force to end plates 40 and 41, as shown in FIG. 13. This filler is a putty material which is curable but has a weak adhesion force to a surrounding member.

As one example of the filler such as the putty material, an adhesive for dental use which is difficult to adhere to a metal and which solidifies and cures can be cited.

Any other filler such as a caulking agent may be used as long as it can prevent the magnet from rattling by being filled into a gap and curing therein.

As described above, according to the present embodiments, adhesion between the magnetic steel plate and the end plate can be prevented, preventing fatigue breakdown of the magnetic steel plate due to the difference in the linear expansion coefficients of the end plate and the magnetic steel plate.

It should be understood that the embodiments disclosed herein are, in all respects, by way of illustration only and are not by way of limitation. The scope of the present invention is set forth by the claims rather than the above description, and is intended to cover all the modifications within a spirit and scope equivalent to those of the claims.

The invention claimed is:

1. A rotor of a rotating electric machine, comprising:
   a rotation shaft;
   a core portion placed around said rotation shaft and provided with a plurality of through-holes;
   a plurality of permanent magnets each accommodated in each of said plurality of through-holes;
   a filler filled into a gap between said permanent magnet and said core portion inside each of said plurality of through-holes;

a pair of end plates sandwiching said core portion from both sides to cover openings of said through-hole; and an adhesion suppressing portion located between and covered by said end plate and said core portion to suppress adhesion between said end plate and said core portion with said filler.

2. The rotor of a rotating electric machine according to claim 1, wherein said adhesion suppressing portion is a non-magnetic member lying in a gap between each of said pair of end plates and said core portion, and a difference between a linear expansion coefficient of said non-magnetic member and a linear expansion coefficient of said core portion is less than a difference between a linear expansion coefficient of said end plate and the linear expansion coefficient of said core portion.

3. The rotor of a rotating electric machine according to claim 2, wherein said non-magnetic member is a plate-shaped member formed to cover at least said through-hole.

4. The rotor of a rotating electric machine according to claim 2, wherein said non-magnetic member is made of a stainless steel.

5. The rotor of a rotating electric machine according to claim 1, wherein said adhesion suppressing portion is a non-magnetic member lying in a gap between each of said pair of end plates and said core portion, and said non-magnetic member is more elastic than said end plate.

6. The rotor of a rotating electric machine according to claim 1, wherein said adhesion suppressing portion is a layer of a mold release agent applied to said end plate.

7. The rotor of a rotating electric machine according to claim 1, wherein said end plate includes a non-magnetic main member and a non-magnetic sub-member fitted into said main member and covering said through-hole, and a difference between a linear expansion coefficient of said sub-member and a linear expansion coefficient of said core portion is less than a difference between a linear expansion coefficient of said main member and the linear expansion coefficient of said core portion.

8. The rotor of a rotating electric machine according to claim 7, wherein said sub-member is made of a stainless steel.

9. The rotor of a rotating electric machine according to claim 1, wherein said end plate includes a non-magnetic main member and a non-magnetic sub-member fitted into said main member and covering said through-hole, and said sub-member is more elastic than said main member.

10. The rotor of a rotating electric machine according to claim 1, wherein said core portion includes a plurality of ferromagnetic plates stacked parallel to a plane orthogonal to said rotation shaft, and each of said plates is provided with a hole for forming said through-hole by stacking said plates.

* * * * *